(12) United States Patent
Shin et al.

(10) Patent No.: US 10,399,228 B2
(45) Date of Patent: Sep. 3, 2019

(54) APPARATUS FOR RECOGNIZING POSITION OF MOBILE ROBOT USING EDGE BASED REFINEMENT AND METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Jae Young Lee, Gunpo-si (KR)

(*) Notice: Subject to any disclaimer, the term of this patent is extended or adjusted under 35 U.S.C. 154(b) by 41 days.

(21) Appl. No.: 15/382,450

(22) Filed: Dec. 16, 2016

(65) Prior Publication Data

US 2017/0151675 A1 Jun. 1, 2017

Related U.S. Application Data

(63) Continuation of application No. PCT/KR2015/006155, filed on Jun. 17, 2015.

(30) Foreign Application Priority Data

Jun. 17, 2014 (KR) .................. 10-2014-0073708

(51) Int. Cl.
*G06K 9/00* (2006.01)
*B25J 9/16* (2006.01)
(Continued)

(52) U.S. Cl.
CPC ............ *B25J 9/1697* (2013.01); *B25J 13/08* (2013.01); *B25J 19/023* (2013.01);
(Continued)

(58) Field of Classification Search
None
See application file for complete search history.

(56) References Cited

U.S. PATENT DOCUMENTS 7,110,602 B2 9/2006 Krause
2015/0227799 A1* 8/2015 Kataoka ............... G06K 9/4604
382/199

FOREIGN PATENT DOCUMENTS

JP 2014022843 A * 2/2014
KR 10-2003-0095492 A1 12/2003
(Continued)

OTHER PUBLICATIONS

Ethan Eade and Tom Drummond, Edge landmarks in monocular SLAM, Image and Vision Computing, vol. 27, Issue 5, pp. 588-596, Apr. 2, 2009.
(Continued)

*Primary Examiner* — Fred H Hu
(74) *Attorney, Agent, or Firm* — Jongkook Park

(57) ABSTRACT

Disclosed are an apparatus of recognizing a position of a mobile robot using edge based refinement and a method thereof. An apparatus of recognizing a position of a mobile robot includes two wide angle cameras which obtain one pair of stereo images on a region of interest including a vertical direction and a horizontal direction in accordance with movement of a mobile robot; and a position recognizing unit which extracts an edge from the obtained stereo images, projects each seed in a key frame selected based on the extracted edge onto the stereo images, updates a status parameter indicating rotation and movement of an optical camera along a direction in which the calculated cost is increased in accordance with the projected seed, and estimates a current position using the updated result.

20 Claims, 10 Drawing Sheets

(51) Int. Cl.

| | | |
|---|---|---|
| G06T 7/73 | (2017.01) | |
| G06T 7/13 | (2017.01) | |
| B25J 19/02 | (2006.01) | |
| G06K 9/46 | (2006.01) | |
| G06K 9/78 | (2006.01) | |
| G06T 5/00 | (2006.01) | |
| B25J 13/08 | (2006.01) | |
| G05D 1/02 | (2006.01) | |
| H04N 13/239 | (2018.01) | |
| H04N 13/00 | (2018.01) | |

(52) U.S. Cl.
CPC ......... *G05D 1/0251* (2013.01); *G05D 1/0253* (2013.01); *G05D 1/0272* (2013.01); *G05D 1/0274* (2013.01); *G06K 9/00664* (2013.01); *G06K 9/4604* (2013.01); *G06K 9/4609* (2013.01); *G06K 9/4647* (2013.01); *G06K 9/78* (2013.01); *G06T 5/002* (2013.01); *G06T 7/13* (2017.01); *G06T 7/74* (2017.01); *G06K 9/00201* (2013.01); *G06T 2207/10021* (2013.01); *G06T 2207/20021* (2013.01); *G06T 2207/30244* (2013.01); *G06T 2207/30252* (2013.01); *H04N 13/239* (2018.05); *H04N 2013/0081* (2013.01); *H04N 2013/0085* (2013.01); *Y10S 901/01* (2013.01)

(56) References Cited

FOREIGN PATENT DOCUMENTS

| KR | 10-0834577 A1 | 6/2008 | |
|---|---|---|---|
| KR | 10-2010-0081588 A1 | 7/2010 | |
| KR | 10-2010-0119442 A1 | 11/2010 | |
| KR | 2010119442 A | * 11/2010 | |
| KR | 10-2011-0011424 A1 | 2/2011 | |
| KR | 10-2011-0047797 A1 | 5/2011 | |
| KR | 10-2011-0097344 A1 | 8/2011 | |
| KR | 10-2012-0070291 A1 | 6/2012 | |
| KR | 10-2013-004674 A1 | 5/2013 | |

OTHER PUBLICATIONS

John Canny, A Computational Approach to Edge Detection, IEEE Transactions on Pattern Analysis and Machine Intelligence, vol. PAMI-8, No. 6 pp. 679-698, Nov. 1986.

S. Benhimane and E. Malis, Homography-based 2D Visual Tracking and Servoing, International Journal of Robotics Research archive vol. 26 Issue 7 pp. 661-676, Jul. 2007.

Michael Calonder, Vincent Lepetit, Christoph Strecha, and Pascal Fua, Brief: Binary Robust Independent Elementary Features, vol. 6314 of the series Lecture Notes in Computer Science pp. 778-792, 11th European Conference on Computer Vision, Heraklion, Crete, Greece, Sep. 5-11, 2010.

Christoph Strecha, Vincent Lepetit, Tomasz Trzcinski, Michael Calonder, Mustafa Özuysal and Pascal Fua, Brief: Computing a local binary descriptor very fast, vol. 34 Issue No. 07, Jul. 2012.

Wooyeon Jeong and Kyoung Mu Lee, CV-SLAM: a new ceiling vision-based SLAM technique, IEEE International Conference on Intelligent Robots and Systems, Aug. 2-6, 2005.

Georg Klein and David Murray, Parallel Tracking and Mapping for Small AR Workspaces, IEEE and ACM International Symposium on Mixed and Augmented Reality, Nov. 13-16, 2007.

Woo Yeon Jeong and Kyoung Mu Lee, Visual SLAM with Line and Corner Features, Proceedings of the 2006 IEEE/RSJ International Conference on Intelligent Robots and Systems Beijing China pp. 2570-2575, Oct. 9-15, 2006.

\* cited by examiner

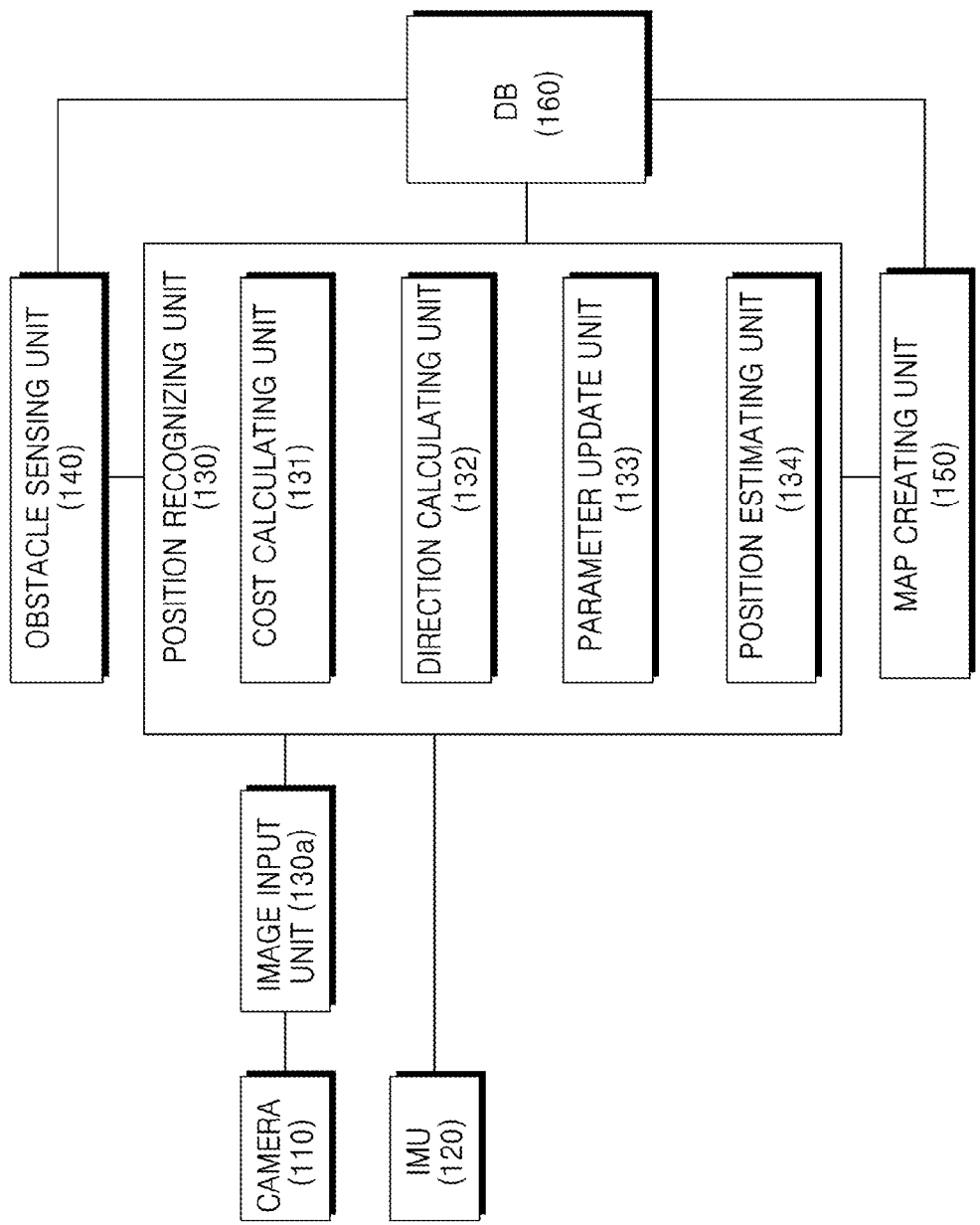
[FIG. 1]

[FIG. 2]
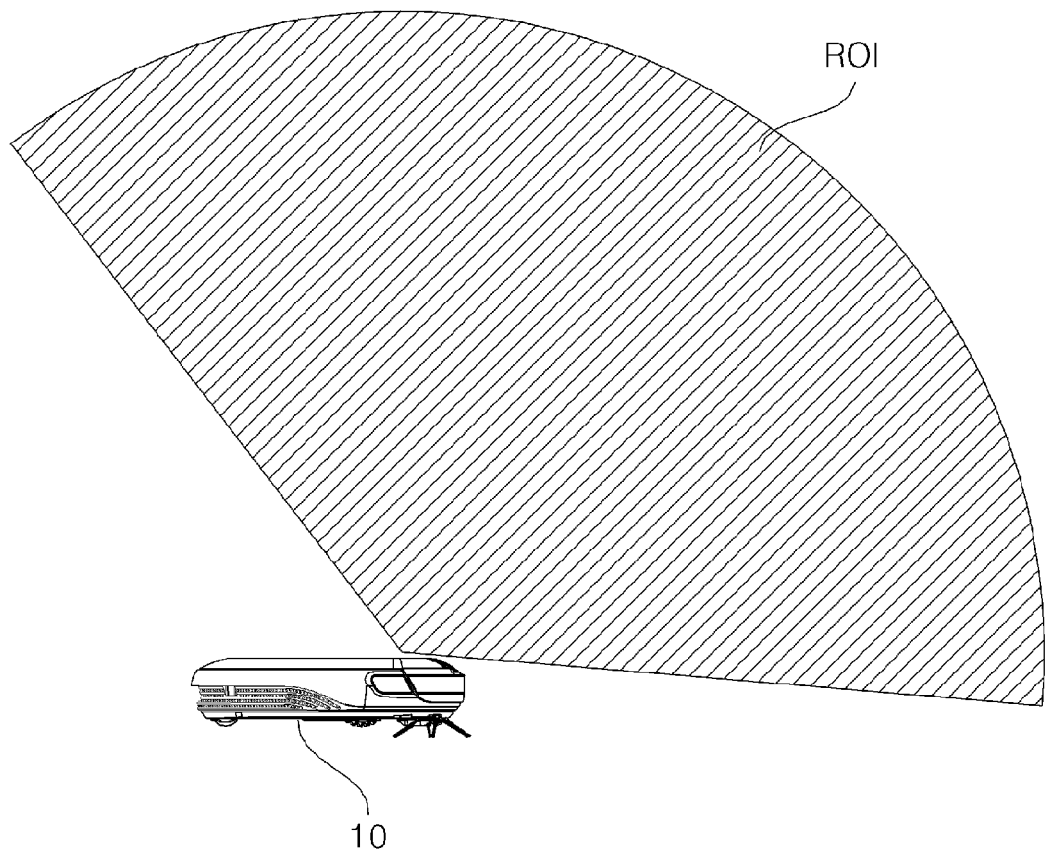

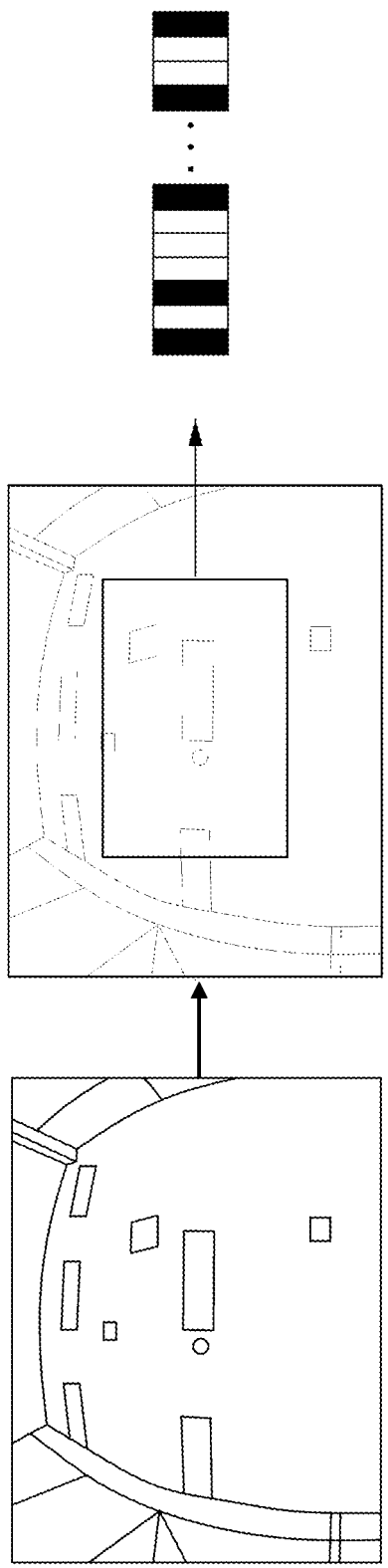

[FIG. 4]
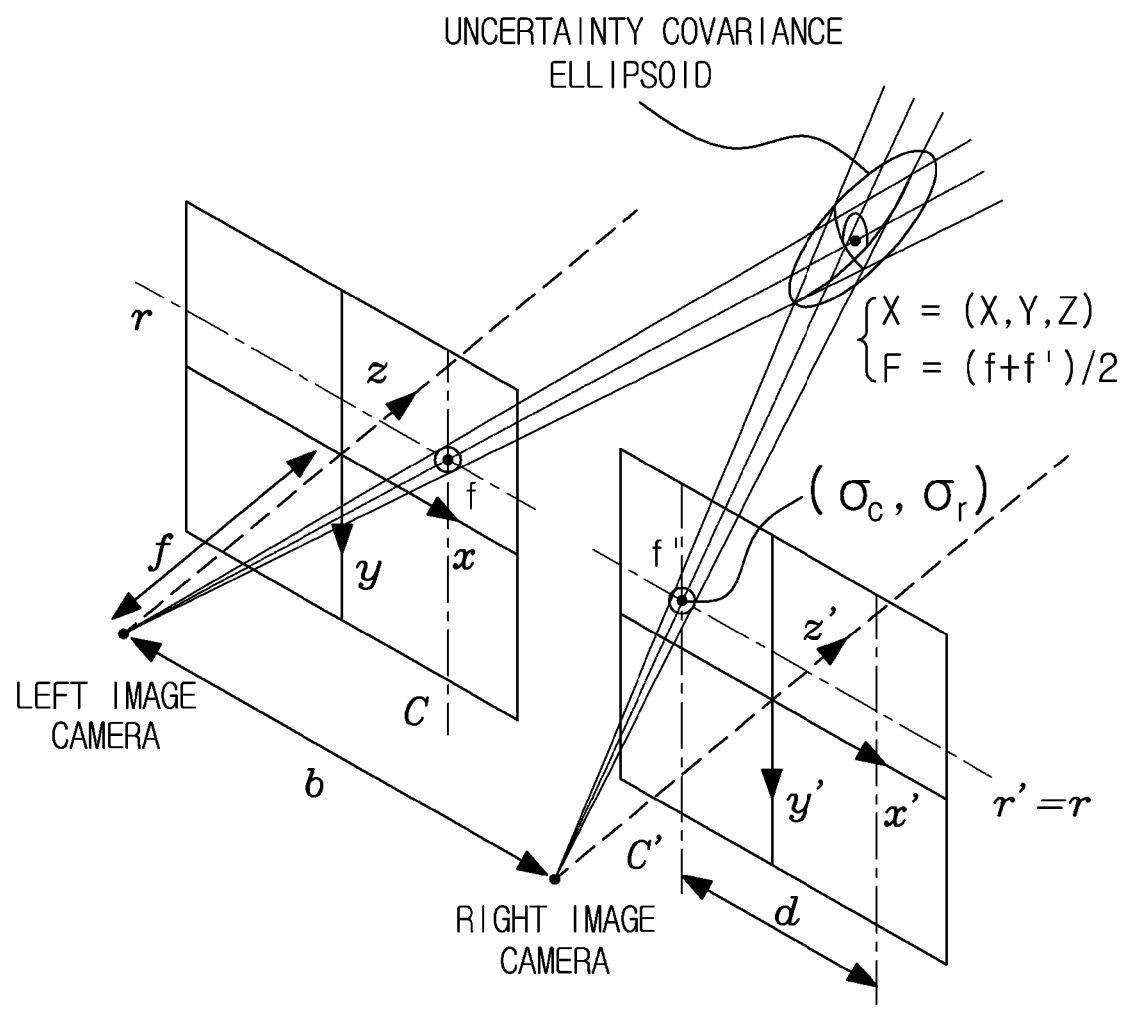

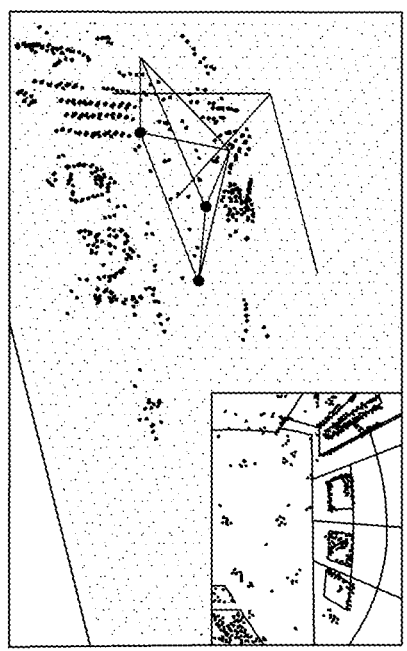
[FIG. 5D]
[FIG. 5C]
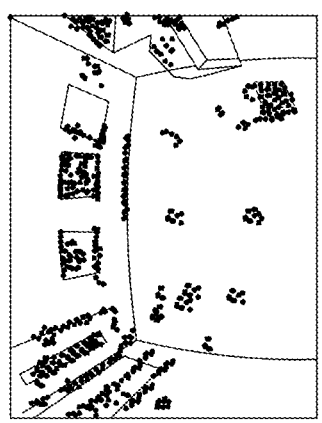
[FIG. 5A]
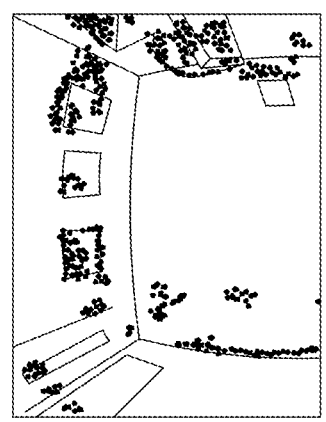
[FIG. 5B]

[FIG. 6]
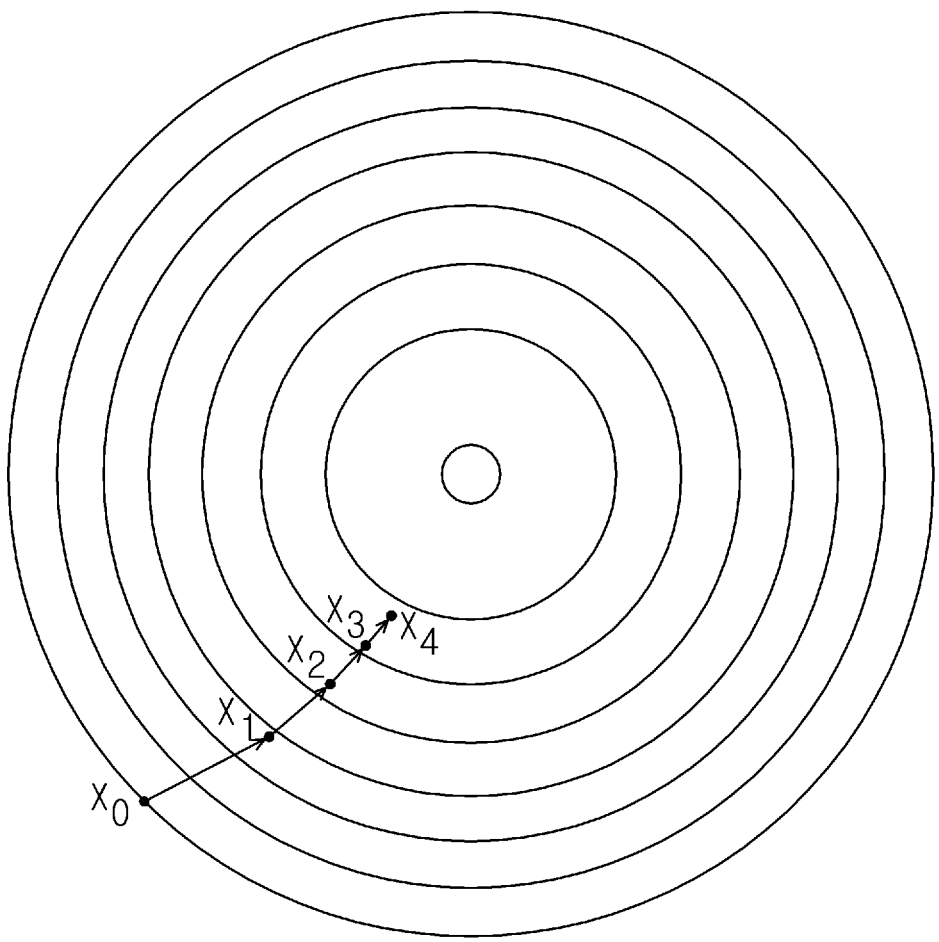

[FIG. 7]
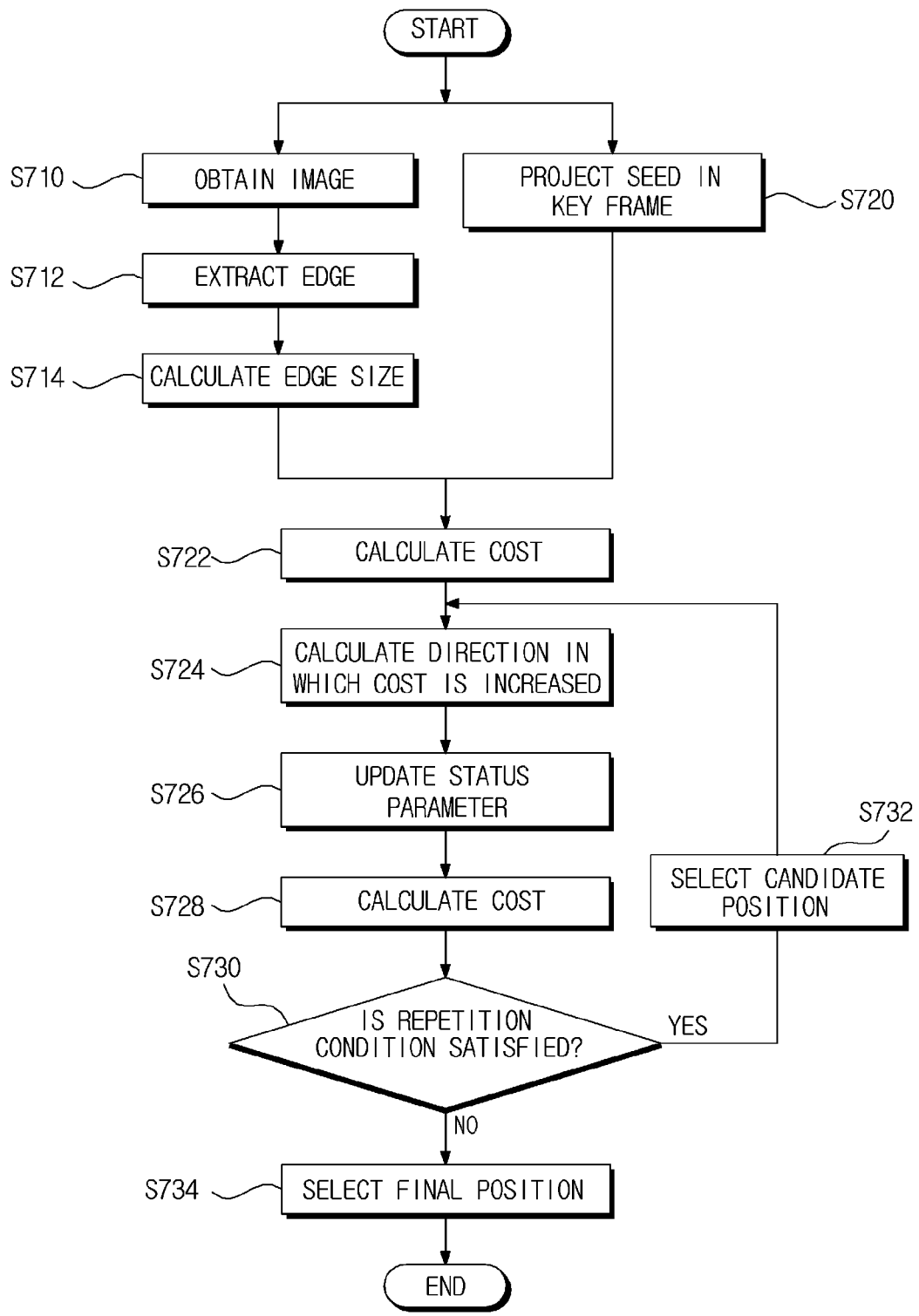

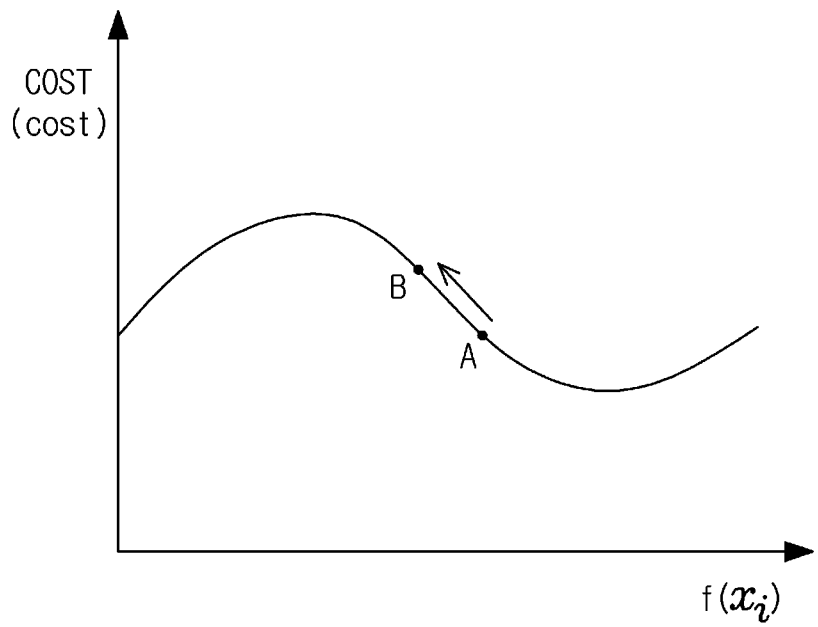
[FIG. 8A]
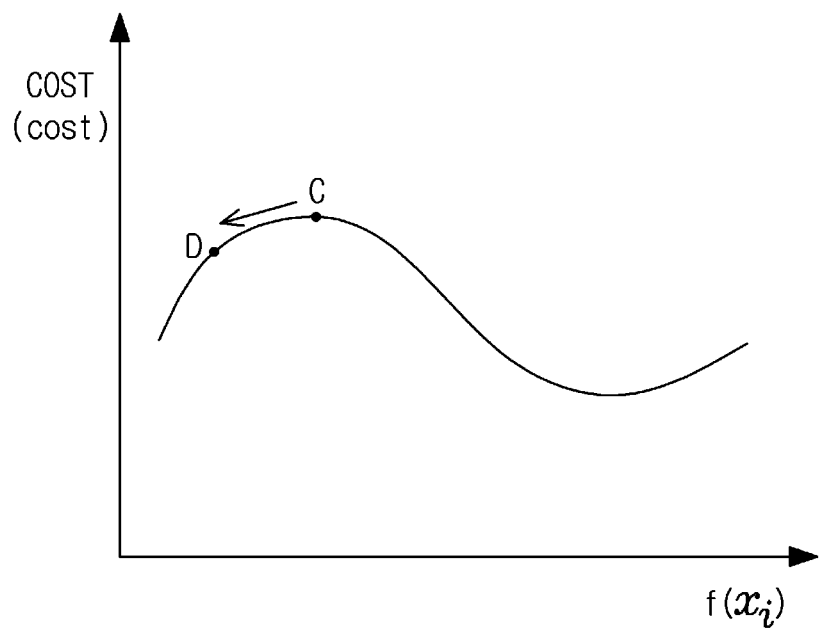
[FIG. 8B]

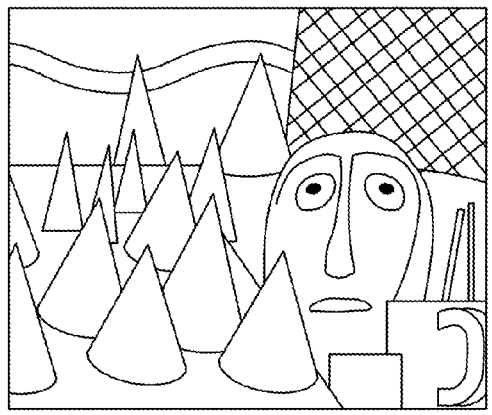
[FIG. 9A]
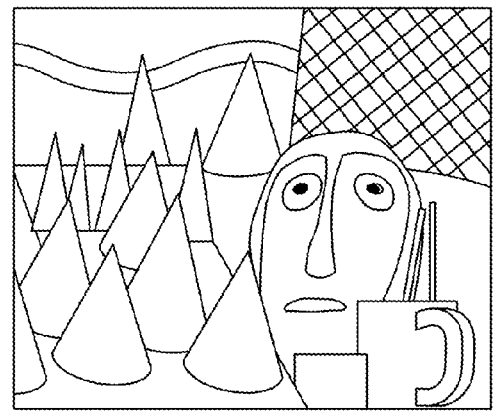
[FIG. 9B]
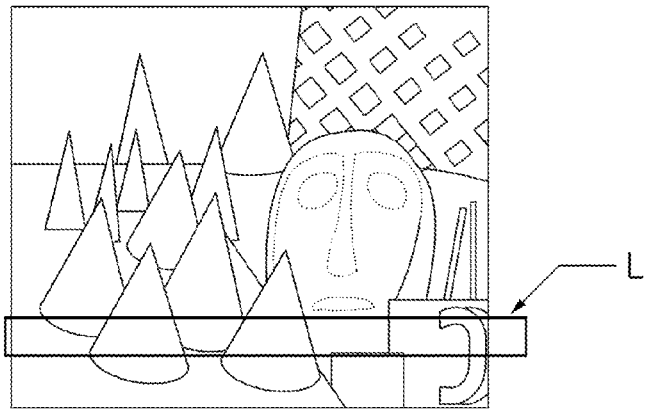
[FIG. 9C]

[FIG. 10]
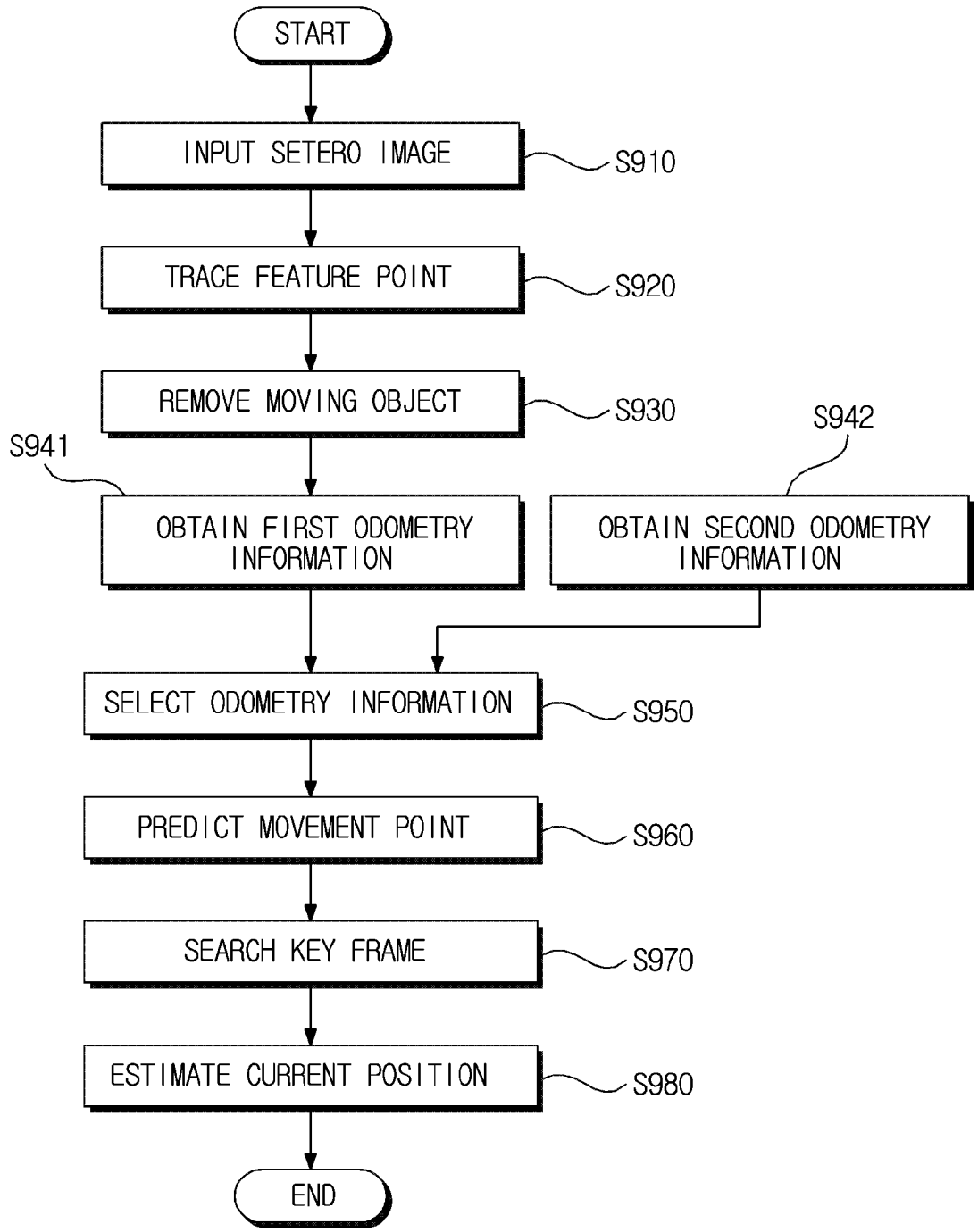

APPARATUS FOR RECOGNIZING POSITION OF MOBILE ROBOT USING EDGE BASED REFINEMENT AND METHOD THEREOF

CROSS-REFERENCE TO RELATED APPLICATIONS

This application is a continuation of International Application No. PCT/KR2015/006155, filed on Jun. 17, 2015, which claims priority to and the benefit of Korean Patent Application No. 10-2014-0073708 filed in the Korean Intellectual Property Office on Jun. 17, 2014, both of which are hereby incorporated by reference in their entireties.

TECHNICAL FIELD

The present invention relates to a position recognizing method of a mobile robot, and more particularly, to an apparatus of recognizing the position of a mobile robot using edge based refinement, and a method thereof.

BACKGROUND

Recently, with the development of robot technology, mobile robots which can set the movement route by themselves have been utilized. In order to allow such mobile robots to efficiently determine a position and move in a space, it is required that the mobile robot be able to recognize its own position in the space while generating a map for the space wherein the robot moves.

Mobile robots employ a gyroscope and a driving motor equipped with an encoder to drive by dead reckoning navigation, and generate a map by analyzing images taken using a camera provided in the upper portion. In this case, when an error is incurred in the driving information from the gyroscope and the encoder, the image information obtained from the camera is utilized to correct the accumulated error.

However, location-based mobile robots which have been developed until now were developed under the assumption of movement on a two-dimensional plane using a monocular camera or laser scanner. However, when a monocular camera is used, it is difficult to determine the distance to a feature point. Therefore, as the error of the dead reckoning navigation is increased, increasingly many errors may be included in the position recognition results.

Further, since laser scanners are too expensive to apply to mobile robots, studies for utilizing a simultaneous localization and mapping (SLAM) technology, which recognizes a space and updates the location using a stereo camera, have been increasing in recent years.

Mobile robots based on SLAM technology perform the processes of extracting a corner feature point from an image, creating a map by restoring three-dimensional coordinates of the corner feature point, and recognizing a location.

It is very important for mobile robots to recognize a space and recognize their own position in the space. Since mobile robots which do not employ the above-described technique have limited mobility and may provide a very limited type of service, mobile robots are being competitively developed.

SUMMARY OF THE INVENTION

In order to solve the above-mentioned problems in the existing technology, the present invention has been made in an effort to provide an apparatus for recognizing the position of a mobile robot using edge based refinement by projecting each seed in a given key frame selected based on a predicted movement point onto an image to calculate the cost indicating the sum of edge sizes as a result of the projection, and updating a status parameter indicating rotation and movement of the camera along the direction in which the calculated cost is increased in order to estimate the position having the highest cost as the current position, and a method thereof.

The present invention has also been made in an effort to provide an apparatus for recognizing the position of a mobile robot using edge based refinement, which estimates a position based on one type of odometry information selected from between the odometry information calculated by visual odometry, based on stereo imaging, and the odometry information calculated using internal odometry, based on inertia information, and a method thereof.

A further objective of the present invention is to provide an apparatus for recognizing the position of a mobile robot using edge based refinement, which extracts a predetermined number of horizontal lines from a stereo image and performs dense stereo alignment along the extracted horizontal lines to obtain information on the distance to an obstacle as a result, and a method thereof.

However, the object of the present invention is not limited to the above description, and other objects which have not been mentioned above will be more apparent to those skilled in the art from a reading of the following description.

According to an aspect of the present invention, an apparatus for recognizing the position of a mobile robot may include: an image input unit which receives at least one pair of stereo images obtained using a camera equipped on a mobile robot; and a position recognizing unit which extracts an edge from the received stereo images, projects each seed in a key frame selected based on the extracted edge onto the stereo images, updates a status parameter indicating the rotation and movement of the camera along the direction in which the calculated cost is increased in accordance with the projected seeds, and estimates the position of the mobile robot using the updated results.

The cost may be the sum of edge sizes according to the projected seed, and the apparatus may further include two cameras which obtain the stereo images for recognizing the position of the mobile robot.

Desirably, the position recognizing unit may project each seed in the selected key frame onto the stereo images to calculate the cost in the current position of the mobile robot using the projected seeds, calculate the direction in which the cost is increased in the current position of the mobile robot, update the status parameter in the position to be updated along the direction in which the cost is increased, and estimate the current position of the mobile robot to be the position having the highest cost based on the updated status parameter.

Desirably, the position recognizing unit may calculate the direction in which the cost is increased from $T_c^i$ in the current position by the equation $$\frac{\partial f(prj(T_c^i, P_i))}{\partial T_c^i},$$

in which $P_i$ indicates the coordinates restored by the seed, prj( ) indicates a function of returning the projection coordinates of the seed relative to the camera, and f( ) indicates a function of returning the edge size in the image.

Desirably, the position recognizing unit may calculate the status parameter $T_c^{i+1}$ in the position to be updated by the equation $$T_c^{i+1} \leftarrow \exp\left(k\frac{\partial f(prj(T_c^i, P_i)}{\partial T_c^i}\right)T_c^i,$$

in which k indicates an arbitrary constant which adjusts the convergence speed.

Desirably, the position recognizing unit may calculate the cost using the status parameter for the position which is to be updated, check whether the preconfigured repetition conditions for re-estimation of the position are satisfied in the position to be updated, and estimate the position to be updated as the final position when the repetition conditions are found not to be satisfied as a result of the check.

Desirably, when the repetition conditions are found to be satisfied as a result of the check, the position recognizing unit may select the position to be updated as a candidate of the position, and update the status parameter along the direction in which the cost is increased in the selected candidate position to repeat the performance of the position estimation process.

Desirably, the repetition conditions may include whether the variation between the cost calculated in the position to be updated and the cost calculated in the previous position is within a predetermined threshold value.

Desirably, the position recognizing unit may predict the status information using the odometry information calculated based on the edge, and use the predicted status information and a previously stored key frame to estimate the current position.

Desirably, the position recognizing unit may predict the state information using one type of odometry information selected from between the first odometry information calculated based on the edge and the second odometry information calculated based on inertial information, and use the predicted state information and a previously stored key frame which is adjacent to the movement point to estimate the current position.

Desirably, the position recognizing unit may select the first odometry information when the first odometry information satisfies the predetermined conditions and select the second odometry information when the first odometry information does not satisfy the predetermined conditions.

Desirably, the position recognizing unit may search for at least one adjacent key frame from among a previously stored key frame set based on the predicted status information and estimate the current position of the mobile robot using at least one of the key frames searched as the result.

According to another aspect of the present invention, a method of recognizing the position of a mobile robot includes the step of receiving at least one pair of stereo images obtained using a camera equipped on a mobile robot; and the step of extracting an edge from the received stereo images, projecting each seed in a key frame selected based on the extracted edge, updating a status parameter indicating the rotation and movement of the camera along the direction in which the calculated cost is increased in accordance with the projected seed, and estimating the position of the mobile robot using the updated results.

Desirably, in the estimation step, each seed in the selected key frame may be projected onto the stereo images to calculate the cost in the current position of the mobile robot using the projected seeds, after which the direction in which the cost is increased in the current position of the mobile robot may be calculated, the status parameter in the position to be updated may be updated along the direction in which the cost is increased, and the current position of the mobile robot may be estimated to be the position having the highest cost based on the updated status parameter.

Desirably, in the estimation step, the direction in which the cost is increased from $T_c^i$ in the current position may be calculated by $$\frac{\partial f(prj(T_c^i, P_i))}{\partial T_c^i},$$

in which $P_i$ indicates the coordinates restored by the seed, prj( ) indicates a function of returning the projection coordinates of the seed relative to the camera, and f( ) indicates a function of returning the edge size in the image.

Desirably, in the estimation step, the status parameter $T_c^{i+1}$ in the position to be updated may be calculated by the equation $$T_c^{i+1} \leftarrow \exp\left(k\frac{\partial f(prj(T_c^i, P_i))}{\partial T_c^i}\right)T_c^i,$$

in which k indicates an arbitrary constant which adjusts the convergence speed.

Desirably, in the estimation step, the cost may be calculated using the status parameter in the position to be updated, a check may be performed to determine whether the preconfigured repetition conditions for re-estimation of the position are satisfied in the position to be updated, and the position to be updated may be estimated as the final position when the repetition conditions are found not to be satisfied as a result of the check.

Desirably, in the estimation step, when the repetition conditions are found to be satisfied as a result of the check, the processes of selecting the position to be updated as a candidate position and updating the status parameter along the direction in which the cost is increased in the selected candidate position to estimate the position may be performed repeatedly.

Desirably, the repetition conditions may include whether the variation between the cost calculated in the position to be updated and the cost calculated in the previous position is within a predetermined threshold value.

Desirably, in the estimation step, one type of odometry information from among the first type of odometry information calculated based on the extracted edge and the second type of odometry information based on inertial information is used to predict the state information, and the predicted state information and a previously stored key frame are used to estimate the current position.

As described above, according to the present invention, each seed in a key frame selected based on the predicted status information is projected onto an image to calculate the cost indicating the sum of edge sizes as a result of the projection, and a status parameter indicating the rotation and movement of the camera is updated along the direction in which the calculated cost is increased to estimate the position having the highest cost to be the current position, thereby recognizing an accurate position.

Further, according to the present invention, the position is estimated based on one type of odometry information selected from between the odometry information calculated from visual odometry, based on stereo imaging, and odometry information calculated from internal odometry, based on inertial information, thereby reducing the positional error incurred when the mobile robot is tilted or slides.

Further, according to the present invention, the problem of vulnerability to positional error incurred when the mobile robot is tilted or slides is solved, so that the position may be stably recognized.

Further, according to the present invention, a predetermined number of horizontal lines is extracted from a stereo image and dense stereo alignment is performed along the extracted horizontal lines to obtain information on the distance to an obstacle as a result, thereby allowing distance information to an obstacle to be obtained without the need to attach an expensive dedicated sensor for measuring distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an apparatus for recognizing a position, according to an exemplary embodiment of the present invention.

FIG. 2 is a view illustrating a region of interest of a wide angle camera, according to an exemplary embodiment of the present invention.

FIGS. 3A, 3B and 3C are views illustrating the space recognition process, according to an exemplary embodiment of the present invention.

FIG. 4 is a view illustrating uncertainty of a three-dimensional point, according to an exemplary embodiment of the present invention.

FIGS. 5A, 5B, 5C and 5D are views illustrating three-dimensional information of an edge, according to an exemplary embodiment of the present invention.

FIG. 6 is a view illustrating a position recognition concept, according to an exemplary embodiment of the present invention.

FIG. 7 is a view illustrating a position recognition process, according to an exemplary embodiment of the present invention.

FIGS. 8A and 8B are views illustrating a position recognition principle, according to an exemplary embodiment of the present invention.

FIGS. 9A, 9B and 9C are views illustrating the obstacle sensing process, according to an exemplary embodiment of the present invention.

FIG. 10 is a view illustrating a method of recognizing the position of a mobile robot, according to an exemplary embodiment of the present invention.

It should be understood that the appended drawings are not necessarily to scale, and present a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for recognizing the position of a mobile robot using edge based refinement and a method thereof, according to an exemplary embodiment of the present invention, will be described with reference to accompanying drawings. The detailed explanation provided herein will be centered on parts which are required to understand the operation and effects of the present invention.

In the description of components of an exemplary embodiment, a component having the same name may be denoted by a different reference numeral in some drawings, but may also be denoted by the same reference numeral in other different drawings. However, even in this case, it does not mean that the component has different functions depending on the exemplary embodiment or that the components have the same function in the different exemplary embodiments, but rather the function of each of the components shall be determined based on the description of the components in the corresponding exemplary embodiment.

As described above, the present invention suggests a new method in which each seed in a given key frame selected based on the predicted movement point is projected onto an image to calculate the cost indicating the sum of edge sizes as a result of the projection, after which a status parameter indicating the rotation and movement of the camera is updated along the direction in which the calculated cost is increased so that the position having the highest cost may be estimated to be the current position.

Further, according to an exemplary embodiment, the position is estimated based on one type of odometry information selected from between the odometry information calculated by visual odometry, based on stereo imaging, and odometry information calculated by internal odometry, based on inertial information, and a predetermined number of horizontal lines is extracted from the stereo image for performance of dense stereo alignment along the extracted horizontal lines to obtain information on the distance to an obstacle as a result.

FIG. 1 is a view illustrating an apparatus for recognizing the position of a mobile robot, according to an exemplary embodiment of the present invention.

The mobile robot position recognizing, apparatus according to an exemplary embodiment of the present invention, may include an image input unit 130a and a position recognizing unit 130. The mobile robot position recognizing apparatus, according to the exemplary embodiment of the present invention, may include at least one of a camera 110, an inertial measurement unit (IMU) 120, a position recognizing unit 130, an obstacle sensing unit 140, a map creating unit 150, and a database (DB) 160, if necessary.

The image input unit 130a receives at least a pair of stereo images obtained from the mobile robot. The stereo images may be images obtained using two cameras mounted on the mobile robot.

Two cameras 110 may be provided to obtain a pair of stereo images, that is, a left image and a right image. Here, two cameras indicates that two different lenses are used to obtain an image at two different viewpoints. Further, the case in which two lenses are provided in one image obtaining device to obtain two images is also included within the scope of the meaning. In this case, the camera 110 may be mounted to have a predetermined area of interest. Here, the region of interest may be a region to be photographed using the camera 110 mounted on the mobile robot.

The camera 110 may be desirably a wide angle camera. A wide angle camera is a camera which takes images using a wide angle lens having an angle of view which is wider than that of a general camera lens. It is desirable to use a wide angle camera for the mobile robot to obtain a broader image of the surroundings. For example, the wide angle camera may be a camera using a fish eye lens. Here, in the wide angle camera, the angle of view of the wide angle lens may be 60 to 270 degrees, for example. In the wide angle camera, according to the exemplary embodiment of the present invention, the angle of view is not limited to the range of the above-described angle of view, and a camera using a lens having various ranges of angles of view may also be utilized.

FIG. 2 is a view illustrating a region of interest of a wide angle camera, according to an exemplary embodiment of the present invention.

As illustrated in FIG. 2, according to the exemplary embodiment of the present invention, unlike existing mobile robots in which the camera is directed either toward the ceiling or the front side, the two cameras 110 mounted on the mobile robot 10 in the present invention employ wide angle lenses which can see both the ceiling and the front side, so that both the ceiling and the front side may be set as regions of interest (ROI).

For example, the camera may take images of regions in both a horizontal direction and a vertical direction using the wide angle lens.

According to the exemplary embodiment of the present invention, both the ceiling and the front side are set as regions of interest using the camera 110 mounted as described above, so that the feature points may be easily secured. Further, the position may now be recognized even in locations where it is difficult to find feature points, and obstacles located at the front side may also be recognized.

The IMU 120 measures inertial information of the mobile robot, for example, information such as the position, pose, and the like.

The position recognizing unit 130 extracts edges from the received stereo images. In this exemplary embodiment of the present invention, as described above, the edges may be extracted using approximated difference of Gaussian (ADoG) or a gradient.

First, a method of extracting an edge using a gradient will be described.

The position recognizing unit 130 obtains gradients in a first axis direction and a second axis direction from each pixel of the received stereo image input and extracts the edge based on the gradients in the direction of the first axis and the direction of the second axis.

The first axis and the second axis may be different axes which are orthogonal to each other in the coordinate system of a plane of a stereo image. Desirably, the first axis and the second axis may be the x-axis and y-axis of an orthogonal coordinate system formed by the x-axis and the y-axis. Hereinafter, the operation of the position recognizing unit 130 employing the x-axis and the y-axis as the first axis and the second axis, respectively, will be described. Hereinafter, the operation of the position recognizing unit 130 which has been described with reference to the x-axis and the y-axis may also be applied to the first axis and the second axis in the same way.

Next, the position recognizing unit 130 calculates the magnitude, $I_m$, of the gradient using gradients $I_x$ and $I_y$ in the x-axis direction and the y-axis direction. The magnitude, $I_m$, may be calculated by the following equation: $I_m = (I_x^2 + I_y^2)^{1/2}$.

Next, the position recognizing unit 130 calculates the angle of the gradient, $I_\theta$, using the gradients $I_x$ and $I_y$ in the x-axis direction and the y-axis direction. The angle $I_\theta$ may be calculated by the following equation: $I_\theta = a\tan 2 (I_x, I_y)$. Here, a tan 2(y,x) is an arctangent calculating function having two input variables and, for example, may be calculated using the following equation:

$$\operatorname{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{underfined} & y = 0, x = 0 \end{cases}$$

Next, the position recognizing unit 130 finally extracts the image of an edge through a non-maximal suppression (NMS) process based on the calculated magnitude of the gradient, $I_m$, and the angle of the gradient, $I_\theta$, of each pixel.

That is, the position recognizing unit 130 selects the pixel having the largest gradient magnitude $I_m$ from among adjacent pixels having the same angle with respect to the angle of the gradient $I_\theta$ of the pixel as the maximal value (maxima).

This process is applied to all pixels to extract an edge formed by one line. Thereafter, the position recognizing unit 130 extends the region to a preconfigured number of pixels adjacent to the pixel located on the line which forms the edge, and may select a pixel in the extended region which has a size that is equal to or greater than a preconfigured threshold value as an edge.

For example, the position recognizing unit 130 extends the region to two pixels which neighbor the pixel most closely, and selects all pixels from among the pixels in the extended region which have a size that is equal to or greater than the predetermined threshold value as an edge.

This process is applied to all pixels to extract a final edge image, which is formed by a plurality of lines extended from the edge formed by one line through NMS.

Here, the NMS (non-maximal suppression) process may use, for example, the non-maximal suppression technique introduced in "Canny, J., A Computational Approach To Edge Detection, IEEE Trans. Pattern Analysis and Machine Intelligence, 8(6):679 to 698, 1986." or may also use other various types of non-maximal suppression techniques.

Next, a method of extracting an edge using an approximated difference of Gaussian (ADoG) will be described.

The present invention suggests a new method in which an integral image is obtained from an original image, after which a box smoothing process is performed on the integral image to obtain a box smoothed image as a result of the box smoothing. The original image is then subtracted from the box smoothed image to finally extract an edge image. In the present invention, the method of extracting an edge by the box smoothing process is referred to as an approximated difference of Gaussian (ADoG).

Here, the position recognizing unit 130 performs a smoothing processing on the received stereo image to obtain a smoothed image. The position recognizing unit 130 then compares the smoothed image and the original stereo image to extract an edge, and may estimate the current position of the mobile robot based on the extracted edge.

Here, the position recognizing unit 130 obtains an integral image from the stereo image, performs a box smoothing process on the obtained integral image to calculate a box smoothed image as a result of the box smoothing process, and compares the calculated box smoothed image and the original stereo image so that the edge may be extracted as a result of the comparison.

To this end, the position recognizing unit 130 may include an integral image obtaining unit, which obtains an integral image from the stereo image; a box smoothing image calculating unit, which performs a box smoothing process on the obtained integral image to calculate a box smoothed image as a result of the box smoothing process; and an edge extracting unit, which compares the calculated box smoothed image and the original stereo image to extract the edge as a result of the comparison. The position recognizing unit may further include a position estimating unit. Here, the position estimating unit may perform the operation of estimating the position of the mobile robot using the edge extracted by the position recognizing unit 130, which will be described in detail below.

The integral image obtaining unit of the position recognizing unit 130, according to the exemplary embodiment of the present invention, may obtain an integral image "IntegImage" from the stereo image "orgImage" through the following Equation:

$$IntegImage(x, y) = \sum_{y'=0}^{y} \sum_{x'=0}^{x} orgImage(x', y')$$

Here, (x, y) indicates a coordinate of the integral image and (x',y') indicates a coordinate of the stereo image.

Next, the smoothing image calculating unit of the position recognizing unit 130 performs a box blurring process or a box smoothing process on the obtained integral image to calculate a box smoothed image as a result of the box smoothing process.

In this case, the box smoothing may be considered as a preprocessing process for removing the noise or extracting contour information, similarly to Gaussian smoothing.

In the present invention, box smoothing processing has been described as an example, but the present invention is not limited thereto, and various other smoothing processing techniques, such as Gaussian smoothing, may also be applied.

Next, the edge extracting unit of the position recognizing unit 130 extracts an edge image "$I_{edge}$" by subtracting the original image, that is, the stereo image "$I_{source}$," from the box smoothed image "$I_{box\_blur}$," which may be calculated using the following equation: $I_{edge}=I_{box\_blur}-I_{source}$.

The final edge image may be extracted through these processes of integration, smoothing, and subtraction.

The position recognizing unit 130 receives stereo image input from the wide angle camera 110 and recognizes a given space based on the received stereo image whenever the mobile robot moves a predetermined distance.

FIG. 3 is a view illustrating the space recognition process, according to an exemplary embodiment of the present invention.

As illustrated in FIG. 3, the position recognizing unit 130 recognizes the given space whenever the mobile robot moves a predetermined distance, or whenever a new key frame is generated, and creates a database thereof.

The position recognizing unit 130 may reduce the received stereo image to be of a preconfigured size for blurring. Here, it is desirable that the preconfigured size may be one eighth the size of the received stereo image. Referring to FIG. 3, the position recognizing unit 130 reduces the received stereo image (a) and generates a blurred image (b).

The position recognizing unit 130 encodes the blurred stereo image using a binary robust independent elementary features (BRIEF) binary descriptor to generate binary data as a result of the encoding. Here, the BRIEF binary descriptor may be encoded using the method introduced in {BRIEF}: Computing a Local Binary Descriptor Very Fast, M. Calonder, V. Lepetit, M. Ozuysal, T. Trzcinski, C. Strecha, and P. Fua IEEE Transactions on Pattern Analysis and Machine Intelligence 2012. Here, the binary data may be generated to be 32 bytes, for example. FIG. 3C is a reference view illustrating the BRIEF binary descriptor.

The position recognizing unit 130 compares the binary data generated as described above with the data indicating the absolute position of the mobile robot in the previously stored key frame, and as a result of the comparison, may recognize the current position using the absolute position when the absolute position falls within a predetermined range.

The reason why the BRIEF binary descriptor is used to recognize a space in the exemplary embodiment of the present invention is because the calculation speed is much faster than that of established descriptors which are used in the related art, such as SIFT or SURF.

The position recognizing unit 130 receives stereo image input from the wide angle camera 110 to obtain first type of odometry information through visual odometry based on the input stereo image, and receives inertial information from the IMU 120 to obtain the second type of odometry information through internal odometry based on the input inertial information. The odometry information to be obtained by the present invention includes a movement distance and a movement angle. Here, the movement angle refers to an angle with respect to a predetermined direction.

In this case, the position recognizing unit 130 extracts a feature point from the stereo image and traces the extracted feature point to obtain odometry information using the traced feature point. The position recognizing unit 131 uses one of the pair of obtained stereo images, generally using the left stereo image.

Generally, the feature point which is extracted during the preprocessing process is a corner. However, it is impossible to obtain a sufficient amount of feature points in regions where there is no texture, such as in a hallway or a large office space.

In order to solve the above-mentioned problem, the position recognizing unit 130 performs stereo matching on the edge. That is, the position recognizing unit 130 extracts an edge from the stereo image and performs sparse stereo matching on the extracted edge. Here, sparse stereo matching is a concept which is distinguished from dense stereo matching. Sparse stereo matching is a matching method which focuses more on roughly and quickly matching stereo images, rather than on calculating exact matching results. Therefore, various established methods of the related art for adjusting the matching interval or adjusting the search range for the matching may be used.

FIG. 4 is a view illustrating the uncertainty of a three-dimensional point, according to an exemplary embodiment of the present invention.

As illustrated in FIG. 4, the position recognizing unit 130 sets the uncertainty σ according to the depth value obtained as a result of stereo matching and stores the uncertainty σ in the DB. In the case of wide angle cameras, the resolution is low because the focal length is very short. Therefore, the reliability of the obtained depth value is low, thus an update is performed later.

The uncertainty of the three-dimensional point obtained using two wide angle cameras is represented by Equation 1.

$$\sum = \begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix} =$$

$$\begin{pmatrix} \frac{b^2\sigma_c^2}{d^2} + \frac{b^2(c-c_0)\sigma_d^2}{d^4} & \frac{(c-c_0)b^2\sigma_d^2(r-r_0)}{d^4} & \frac{(c-c_0)b^2\sigma_d^2 f}{d^4} \\ \frac{(c-c_0)b^2\sigma_d^2(r-r_0)}{d^4} & \frac{b^2\sigma_r^2}{d^2} + \frac{b^2(r-r_0)\sigma_d^2}{d^4} & \frac{(r-r_0)b^2\sigma_d^2 f}{d^4} \\ \frac{(c-c_0)b^2\sigma_d^2 f}{d^4} & \frac{(r-r_0)b^2\sigma_d^2 f}{d^4} & \frac{f^2 b^2 \sigma_d^2}{d^4} \end{pmatrix}$$

Here, $$\begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

indicates an uncertainty covariance ellipsoid, b indicates the distance between the cameras, x, y, and z indicate the coordinate system of the left imaging camera, x', y', and z' indicate the coordinate system of the right imaging camera, (c, r) and (c', r') indicate the coordinates of matching pixels in the left camera and the right camera, f and f' indicate the focal distances of the left camera and the right camera, $\sigma_r$ and $\sigma_c$ represent the uncertainty when the feature point is extracted, as axes of the coordinate system, and $r_0$ and $c_0$ represent the optical axis of the camera by a camera coordinate system. Further, d is the difference generated when the feature point is projected to the left side and the right side, and is generally referred to as disparity. $\sigma_d$ represents the uncertainty of the measured depth value.

At a time when it is determined that the mobile robot has moved a predetermined distance, pixels which are stored in the key frame are projected onto the current image to find the most similar pixel, with which the depth value is updated. The update may be performed by applying a general Bayesian rule.

In this case, while the mobile robot is in motion, erroneous information is input due to various variables, specifically, moving obstacles or a blockage, thus there may exist outliers among the depth values obtained based on erroneous information.

In order to solve the above-mentioned problem, when the obtained depth value is within 1Σ, the variable "no_success" is increased by one, and when the obtained depth value is larger than 1Σ, the variable "no_failure" is increased by one. Thereafter, only when the reliability no_success/(no_success+no_failure) is larger than a specific value is the depth value used to recognize the position.

The Bayesian rule which is used to update the depth value is represented by Equation 2.

$$\mu = [\sigma_{z_2}^2/(\sigma_{z_1}^2 + \sigma_{z_2}^2)]\mu_{z_1} + [\sigma_{z_1}^2/(\sigma_{z_1}^2 + \sigma_{z_2}^2)]\mu_{z_2}$$

$$1/\sigma^2 = (1/\sigma_{z_1}^2) + (1/\sigma_{z_2}^2)$$ [Equation 2]

μ is the average depth value, $\mu_{z_1}$ is the average of the previously obtained depth values, $\mu_{z_2}$ is the average of the currently measured depth values, σ is the uncertainty of μ, $\sigma_{z_1}$ is the uncertainty of $\mu_{z_1}$, and $\sigma_{z_2}$ is the uncertainty of $\mu_{z_2}$. Here, although the updating process of the depth value z has been described, the x- and y-values vary depending on z. Therefore, x, y, and z are all updated so that the position may be determined, and the updated x, y, and z are used for inverse determination of the camera position.

FIG. 5 is a view illustrating the three-dimensional information of an edge according to an exemplary embodiment of the present invention. FIG. 5A is an image representing a depth value which is projected to the left imaging camera, FIG. 5B is an image representing a depth value which is projected to the right imaging camera, FIG. 5C is an image representing a depth value obtained through the updating process, and FIG. 5D is an image representing projection to a matching point and a depth value.

As illustrated in FIG. 5, it is understood that when the depth value is repeatedly updated, the three-dimensional information on the edge may be consistently obtained.

The information from the IMU is very important in situations where it is difficult to recognize the environment using a camera. However, in low-priced IMUs, the bias varies significantly, or it may be difficult to estimate. In order to solve said problem, the bias is obtained by stopping the robot for a moment and taking an average. In this case, however, there are disadvantages in that the user may think that the mobile robot is unintelligent, and the working speed is also lowered.

In order to solve the above-mentioned problems, the position recognizing unit 130 updates the bias even during movement.

It is assumed that $\theta_g$ is the angular velocity obtained by a gyro sensor and $\theta_c$ is the angular velocity obtained by wide angle stereo vision. Error may be incurred between these angular velocities due to bias while the mobile robot is in motion. The error, $\theta_e$, may be defined by Equation 3.

$$\theta_e = \theta_g - \theta_c$$ [Equation 3]

In this case, $\theta_e$ may be a bias. When speedy rotation or disturbance occurs, the bias is updated by applying the Bayesian rule as represented by Equation 4.

If, $|\theta| < \text{threshold}_{moving}$, $\mu_n = \theta_e$, $\sigma^2 = 1$ deg/sec×0.1 deg/sec [Equation 4]

$\mu_n$ indicates the error of the bias, and σ indicates the uncertainty of $\mu_n$. When the mobile robot may stop during movement, the bias is updated as represented by Equation 5.

If, $|\theta| < \text{threshold}_{stop}$, $\mu_n = \theta_e$, $\sigma^2 = 0.1$ deg/sec×0.1 deg/sec [Equation 5]

Since the bias is corrected in real time by the above-described update process, the odometry information obtained through use of the IMU may maintain a predetermined level of accuracy using the optimal bias even when the camera cannot be used momentarily.

The position recognizing unit 130 selects either the first type of odometry information or the second type of odometry information and uses the selected information as a basis for estimating the current state information of the mobile robot, for example, the pose or position. That is, the position recognizing unit 130 accumulates the odometry information which is periodically measured during movement, specifically, the movement distance and the movement angle, to predict the relative position and angle from the movement point calculated from the accumulation results, using the point at which movement starts.

Here, the position recognizing unit 130 uses the edge extracted from a stereo image to perform stereo matching between stereo images, and then calculates the disparity value or depth value of the pixels included in the stereo image in order to estimate the current position of the mobile robot using the calculated disparity or depth value. That is, the stereo matching between stereo images is performed on the pixels corresponding to the edge extracted from the stereo image in order to calculate the disparity or depth value, and the current position of the mobile robot is then estimated using the disparity or depth value, along with the optical axis information of the camera, the focal distance information, and information of the distance between the stereo cameras. That is, when the disparity or the depth value of a specific pixel in the stereo image and the specification information (optical axis, focal distance, and distance between cameras) of the camera which obtained said stereo image are known, the three-dimensional coordinates of the pixel may be restored, and the position of the mobile robot may be determined relatively through the three-dimensional coordinates of the pixels included in the stereo image.

For example, when the optical axes u0 and v0 are known, the focal distance f, the distance b between cameras are known, and the disparity d is found through stereo matching, the restored three-dimensional coordinates (x, y, z) are $$\left(\frac{b(u-u0)}{d}, \frac{b(v-v0)}{d}, \frac{fb}{d}\right)$$

u and v indicate the coordinates of a pixel in the stereo image.

Further, as the method of determining the position of the object from which the stereo image was obtained using the depth value of the stereo image, various existing techniques of the related art may be employed.

Here, a seed may be set for a pixel selected from the edge of the image. Further, the seed may be set for pixels for which the three-dimensional coordinates have been restored as described above. Here, the seed may include at least one of an image coordinate, a disparity or a depth, a variance of disparity or a variance of depth, a pixel value, and a gradient direction and magnitude.

The position recognizing unit 130 may predict the current position using at least one adjacent key frame from among the previously stored key frame set based on the predicted status information. That is, the position recognizing unit 130 may estimate the current position using at least one key frame which is adjacent to the predicted movement point, contained in the status information.

Here, the key frame may be a set of seeds indicating pixels selected from the edge of the stereo image, which contain periodically measured information regarding the state of the mobile robot, and the relationship between the key frame, K, and the seed, s, is represented by Equation 6.

$$K=\{s_0, s_1, \ldots, s_n\} \quad \text{[Equation 6]}$$

In this case, the position recognition of the mobile robot may be predicted using a registered key frame, and may be considered as the process of calculating how much the mobile robot has moved with respect to the given key frame.

That is, when the rotation and the movement of one camera with respect to the key frame are defined by the parameters R and T, respectively, the projection to the current camera of a coordinate Pi, restored through the seed, is represented by Equation 7.

$$p=prj(R,T,P_i) \quad \text{[Equation 7]}$$

Here, p indicates the projection coordinates of the seed to the camera. prj( ) indicates a function of returning the projection coordinates of the seed to the camera.

The projection coordinates of the seed calculated by Equation 7 are gathered onto an edge in the image, which is enabled by having appropriate R and T values. That is, the more accurate the position recognition results, the tighter the projection of the coordinates restored through all seeds to the current camera will be gathered at the edge.

The position recognizing unit 130 includes a cost calculating unit 131 which projects each seed in the selected key frame onto the stereo image and uses the projected seeds to calculate the cost in the current position of the mobile robot, a direction calculating unit 132 which calculates the direction in which the cost is increased for the current position of the mobile robot, a parameter update unit 133 which updates the status parameter for the position to be updated along the direction in which the cost is increased, and the position estimating unit 134 which estimates the position having the highest cost to be the current position of the mobile robot based on the updated status parameter.

FIG. 6 is a view illustrating the position recognition concept, according to an exemplary embodiment of the present invention.

Referring to FIG. 6, it is understood that when the current position is assumed to be $x_0$, if the parameters R and T are continuously updated along the direction in which the sum of edge sizes, that is, the cost, is increased, the position is changed as follows: $x_0 \rightarrow x_1 \rightarrow x_2 \rightarrow x_3 \rightarrow x_4$.

That is, when Equation 3 is used, the cost is changed according to the parameters R and T. As a result, when the parameters R and T are updated along the direction in which the cost is increased, a very accurate position may be obtained.

In the exemplary embodiment of the present invention, the accurate position is recognized by updating the parameters R and T using gradient descent, which is referred to as edge based refinement.

Here, the gradient descent method is one of the representative methods which apply the concept of differentiation to the problem of optimization. Gradient descent is a method which moves in the negative direction of the gradient in the current position in order to find the maximum point of an arbitrary function.

FIG. 7 is a view illustrating the position recognition process, according to an exemplary embodiment of the present invention.

As illustrated in FIG. 7, the position recognizing unit 130 obtains an image at the present point in time in step S710, extracts an edge from the obtained image in step S712, and calculates the magnitude of the extracted edge in step S714.

Here, the position recognizing unit 130 finds the gradient in each pixel of the edge-containing image in both the direction of a first axis and a second axis, calculates the magnitude of the gradient using said gradients in the first and second axis directions, and sets the calculated magnitude of the gradient to be the size of the edge.

Here, the first axis and the second axis may be different axes which are orthogonal to each other in the coordinate system of the edge-containing image plane. That is, the first and second axes may be different axes which are orthogonal to each other in the coordinate system of the plane of an edge-containing image. Desirably, the first axis and the second axis may be the x-axis and y-axis of the orthogonal coordinate system formed by the x-axis and the y-axis.

In this case, the position recognizing unit 130 obtains the gradients from each pixel of the image in the x-axis and y-axis directions, $I_x$ and $I_y$, and calculates a gradient magnitude $I_m$ using the obtained gradients in the x- and y-axis direction, $I_x$ and $I_y$, as represented in Equation 8. Here, the magnitude of the gradient may be considered as the size of the edge.

$$I_m = (I_x^2 + I_y^2)^{1/2} \qquad \text{[Equation 8]}$$

Next, the position recognizing unit 130 projects each seed in the selected key frame onto an image and uses the resulting projection to calculate the sum of edge sizes, that is, the cost, after which it updates the status parameters indicating rotation and movement of the camera along the direction in which the calculated cost is increased to finally estimate the position having the highest cost to be the current position.

That is, the position recognizing unit 130 uses the projected seeds to calculate the cost in the applicable position. The above-described operation of the position recognizing unit 130 may be performed by the cost calculating unit 131.

In this case, how well the projected coordinates of the seeds are gathered onto the edge may be confirmed by the sum of the edge sizes. This sum of the edge sizes, that is, the cost, is represented by Equation 9.

$$\sum_{i=0}^{n} f(prj(R, T, P_i)) \qquad \text{[Equation 9]}$$

Here, f( ) is a cost function, and is a function of returning the edge size from the image.

In this case, when the rotation and movement R and T of the camera in Equation 9 are defined as a status parameter, $T_c$, for use of the gradient descent method, the cost in the applicable position is represented by Equation 10.

$$\sum_{i=0}^{n} f(prj(T_c, P_i)) \qquad \text{[Equation 10]}$$

The position recognizing unit 130 calculates the direction in which the cost is increased from $T_c^i$ in the current position $x_i$. The direction in which the cost is increased is represented by Equation 11. The above-described operation of the position recognizing unit 130 may be performed by the direction calculating unit 132.

$$\frac{\partial f(prj(T_c^i, P_i))}{\partial T_c^i} \qquad \text{[Equation 11]}$$

The position recognizing unit 130 may update $T_c^{i+1}$ in the position $x_{i+1}$, which is to be updated along the direction in which the cost is increased. The status parameter $T_c^{i+1}$ of the position to be updated is represented by Equation 12. The above-described operation of the position recognizing unit 130 may be performed by the parameter update unit 133.

$$T_c^{i+1} \leftarrow \exp\left(k \frac{\partial f(prj(T_c^i, P_i))}{\partial T_c^i}\right) T_c^i \qquad \text{[Equation 12]}$$

Here, k is an arbitrary constant which adjusts the convergence speed, and may be adjusted appropriately in accordance with convergence.-{ }-

The position recognizing unit 130 calculates the cost using the status parameter of the position to be updated. The cost in the position to be updated is represented by Equation 13.

$$\sum_{i=0}^{n} f(prj(T_{c+1}, P_i)) \qquad \text{[Equation 13]}$$

The position recognizing unit 130 compares the cost calculated for the position to be updated with that calculated for the previous position to check whether the predetermined repetition conditions for re-estimation of the position are satisfied.

Here, the repetition conditions for determining whether to update include conditions such as whether the variation between the cost calculated in the position to be updated and the cost calculated in the previous position are within a preconfigured threshold value.

That is, the position recognizing unit 130 calculates the variation between the cost calculated in the position to be updated and the cost calculated in the previous position and compares whether the calculated variation is equal to or greater than the predetermined threshold value.

When the calculated variation is found to be equal to or greater than the predetermined threshold value as a result of the comparison, the position recognizing unit 130 selects the position to be updated as a candidate position and checks the coordinates of the selected candidate position.

Thereafter, the position recognizing unit 130 calculates the direction in which the cost is increased in the candidate position and uses the calculation results to update the status parameters along the direction in which the cost is increased, which is used as the basis to perform additional estimation of the position.

In contrast, when the variation is found to be within the predetermined threshold value as a result of the comparison, the position recognizing unit 130 determines that the position variation arising through the update of the status parameters is very insignificant, indicating that the position has not changed, and selects the previous position as the final position of the mobile robot, ending subsequent processes.

The position estimation operation of the position recognizing unit 130 may be performed by the position estimating unit 134.

FIGS. 8A and 8B are views illustrating the position recognition principle, according to an exemplary embodiment of the present invention.

Referring to FIG. 8A, the cost according to the position of the mobile robot is illustrated. In the drawing, the case in which position B is to be updated in the direction in which the cost is increased from the current position, A, is illustrated.

Referring to FIG. 8B, the cost according to the position of the mobile robot is illustrated. In the drawing, since the cost is maximal in the current position, C, the current position is not updated to the position D.

As described above, according to the present invention, the process of projecting the seeds in a key frame selected based on the predicted status information to calculate the cost for the pixels in the image onto which the seeds are projected and updating the status parameters along the direction in which the calculated cost is increased to estimate the position based on the updated status parameter is repeatedly performed until it is determined that the position remains scarcely changed by the process.

The obstacle sensing unit 140 receives stereo image input from the wide angle camera 110 and extracts a predetermined number of horizontal lines from the received stereo image. Here, the predetermined number is at least two, and desirably three.

The obstacle sensing unit 140 performs dense stereo matching along the extracted horizontal lines to obtain information on the distance to an obstacle as a result. Here, the dense stereo matching is a concept which is distinguished from sparse stereo matching, and is a matching method for calculating exact matching results when matching is performed between stereo images. To this end, various established methods of the related art for adjusting the matching interval or adjusting the search range for the matching may be used.

FIG. 9 is a view illustrating the obstacle sensing process, according to an exemplary embodiment of the present invention.

As illustrated in FIG. 9, the obstacle sensing unit 140 performs highly dense stereo matching based on the received left and right stereo images, as illustrated in FIGS. 9A and 9B, to calculate the depth value. Here, in the image of FIG. 9C, the depth value calculated as described above is represented in grayscale. Further, FIG. 9C illustrates a linear region, L, which is used to sense the obstacle.

In this case, since the depth values for the entire region cannot be calculated by a mobile robot mounted with a small-sized processor, in the exemplary embodiment of the present invention, the depth values are extracted only from a partial region.

The map creating unit 150 is provided with the current position information estimated by the position recognizing unit 130, reconstructs a pose graph based on the provided position information, and may update the previously stored key frame set based on the reconstructed pose graph. A map may be configured by the set of key frames.

The DB 160 stores the key frame set generated in accordance with movement of the mobile robot, that is, the map.

A method for recognizing the position of a mobile robot, according to another exemplary embodiment of the present invention, may include the steps of receiving at least one pair of stereo images obtained using a camera mounted on the mobile robot, extracting an edge from the received stereo images and projecting each seed in a key frame selected based on the extracted edge, using the projection to calculate the cost (for a pixel in the image onto which the seed is projected) in order to update a status parameter, indicating the rotation and movement of the camera, along the direction in which the cost is increased, and estimating the position of the mobile robot using the updated result. The method for recognizing the position of a mobile robot may operate in the same way as the apparatus for recognizing the position of the mobile robot described above. Therefore, redundant parts will be omitted or described simply.

In the estimation step, each seed in the selected key frame is projected onto an image to calculate the cost in the current position of the mobile robot using the projected seeds, the direction in which the cost is increased in the current position of the mobile robot is calculated, the status parameter in the position to be updated is updated along the direction in which the cost is increased, and the position having the highest cost is estimated to be the current position of the mobile robot based on the updated status parameter.

FIG. 10 is a view illustrating a method of recognizing the position of a mobile robot, according to an exemplary embodiment of the present invention.

As illustrated in FIG. 10, when an apparatus for recognizing the position of the mobile robot (hereinafter referred to as a position recognizing apparatus), according to an exemplary embodiment of the present invention, receives stereo image input from the wide angle camera in step S910, it extracts a feature point from the input stereo image and continuously traces the extracted feature point by frame in step S920.

Next, the position recognizing apparatus may remove moving objects from the stereo image in step S930.

For example, the position recognizing apparatus compares the current frame and the last n-th frame, and as a result of the comparison, is able to remove inconsistent features which may be determined as moving objects.

Next, the position recognizing apparatus performs visual odometry based on the traced feature point to obtain the first type of odometry information as the result in step S940, and obtains the second type of odometry information through internal odometry, based on inertial information, in step S942.

Next, the position recognizing apparatus selects one type of odometry information from between the first and second types of odometry information in step S950, and uses the selected odometry information and pose information to predict the state information in step S960.

In this case, the position recognizing apparatus selects the first odometry information when the first odometry information satisfies the predetermined conditions, and selects the second odometry information when the first odometry information does not satisfy the predetermined conditions.

Here, determining whether the predetermined conditions have been satisfied refers to determining whether the odometry information, such as the rate of change of the position information, for example, is within a predetermined threshold value.

Next, based on the predicted state information, the position recognizing apparatus searches at least one adjacent key frame from among the previously stored key frame set in step S970, and estimates the current position using at least one of the key frames searched in step S980.

That is, the position recognizing apparatus performs the processes of projecting each seed in a selected key frame onto an image and calculating the cost indicating the sum of edge sizes as the result of the projection, and updating a status parameter indicating rotation and movement of a camera along the direction in which the calculated cost is increased in order to estimate the position having the highest cost to be the current position, thereby calculating a final position.

In this case, the position may be more accurately estimated as the number of adjacent key frames increases.

The position recognizing apparatus, according to the exemplary embodiment, may be applied to autonomous cleaning robots or service robots. For example, cleaning robots autonomously move in indoor or outdoor environments. When the cleaning robot moves, it meets various obstacles such as walls, guardrails, desks, or furniture, and the autonomous cleaning robot uses its own position in the cleaning area along with the positions of obstacles in order to determine a driving route, along which it moves. According to the exemplary embodiment, the autonomous cleaning robot includes a stereo camera, specifically, a wide angle stereo camera, as an image capturing unit to obtain external images. Through the external environmental information so-acquired, especially the feature points related to edges, the autonomous cleaning robot is able to estimate its own position, determine the driving route, and thus move.

Specifically, in the case of cleaning robots which autonomously move based on simultaneous localization and map-building (SLAM), the exemplary embodiment may be used for the robot to estimate its own position on the constructed lattice map, to estimate the position of obstacles, to determine a movement route to avoid collision with the obstacles using the estimated position relationships, and to determine an optimal route.

In the exemplary embodiment, the odometry information may be data which is used to estimate the positional change of the mobile robot in accordance with time. For example, the odometry information may be information which is obtained from a wheel mounted on the mobile robot, or from rotary encoders in a legged joint. The status information such as movement distance of the mobile robot or number of rotations of the wheel may be calculated using the odometry information. Further, the space wherein the mobile robot is currently located may be understood through the status information so that the odometry information may be used to determine the key frame during image processing.

The position recognition method, according to the exemplary embodiment of the present invention, may be implemented as computer readable software, and the software may be executed in a processor mounted in an autonomous cleaning robot.

Even though all components of the exemplary embodiment may be combined as one component or their operations may be combined, the present invention is not limited to the exemplary embodiment. In other words, if it is within the scope or purpose of the present invention, one or more of all of the components may be selectively combined for operation. Further, all of the components may be implemented as one independent hardware, but a part or all of the components may be selectively combined for implementation as a computer program which includes a program module that performs a part or all of the functions combined in one or plural hardwares. Further, such a computer program may be stored in computer readable media such as a USB memory drive, a CD disk, or a flash memory to be read and executed by a computer for implementation of the exemplary embodiment of the present invention. The storage media of the computer program may include media such as magnetic recording media, optical recording media, and carrier wave media.

The exemplary embodiments of the present invention which have been described above are examples, and it is obvious to those skilled in the art that various changes or modifications may be made without departing from the spirit and scope of the present invention. Therefore, the exemplary embodiments of the present invention are provided for illustrative purposes only, and are not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A mobile robot comprising:
a camera system;
at least one processor; and
a non-transitory computer-readable medium storing instructions that, when executed by the at least one processor, cause the mobile robot to,
receive at least one pair of stereo images obtained from the camera system,
extract an edge from the at least one pair of stereo images,
project a seed in a key frame selected based on the extracted edge onto the at least one pair of stereo images,
update a status parameter indicating a rotation and a movement of the mobile robot along a direction in which a calculated cost increases in accordance with the projected seed, and
estimate a position of the mobile robot using the updated status parameter,
wherein the key frame includes a set of seeds generated by stereo matching edges extracted from the stereo images,
wherein the set of seeds includes at least one of an image coordinate, a disparity, a pixel value, and a gradient,
wherein the instructions, when executed by the at least one processor, further cause the mobile robot to restore three-dimensional coordinates of the set of seeds using an optical axis, a focal length, a distance between stereo lenses of the camera system and a disparity value, and
wherein the three-dimensional coordinates have depth values.

2. The mobile robot of claim 1, wherein the cost is a sum of edge sizes according to the projected seed, and
wherein the camera system includes first and second cameras positioned to obtain the at least one pair of stereo images.

3. The mobile robot of claim 1, wherein the instructions, when executed by the at least one processor, further cause the mobile robot to calculate the cost using the projected seed, calculate the direction in which the cost increases, update the status parameter along the direction in which the cost increases, and estimate the position of the mobile robot as a position having a highest cost based on the updated status parameter,
wherein, when the mobile robot moves a predetermined distance, the mobile robot (i) calculates the depth values by projecting the three-dimensional coordinates corresponding to the key frame into the current image, (ii) sets uncertainty of the depth values, (iii) increases a success variable or a failure variable according to a result of comparing the uncertainty of the depth values with a predetermined threshold, (iv) filters the depth values to satisfy reliability defined by the success variable and the failure variable, and (v) updates the filtered depth values to obtain three-dimensional information on the edges.

4. The mobile robot of claim 3, wherein the instructions, when executed by the at least one processor, further cause the mobile robot to calculate the direction in which the cost increases from $T_c^i$ in a current position by the following equation $$\frac{\partial f(prj(T_c^i, P_i))}{\partial T_c^i},$$

in which $P_i$ indicates a coordinate restored by the seed, prj( ) indicates a function of returning the projection coordinate of the seed to the camera system, and f( ) indicates a function of returning the edge size in the at least one pair of stereo images.

5. The mobile robot of claim 4, wherein the instructions, when executed by the at least one processor, further cause the mobile robot to calculate a status parameter $T_c^{i+1}$ in the position to be updated by the following equation $$T_c^{i+1} \leftarrow \exp\left(k\frac{\partial f(prj(T_c^i, P_i)}{\partial T_c^i}\right)T_c^i$$

in which k indicates an arbitrary constant for adjusting a convergence speed.

6. The mobile robot of claim 3, wherein the instructions, when executed by the at least one processor, further cause the mobile robot to calculate the cost using the status parameter in a position to be updated, check whether to satisfy a predetermined repetition condition to re-estimate the position in the position to be updated, and estimate the position to be updated as a final position when the repetition condition is not satisfied.

7. The mobile robot of claim 6, wherein the instructions, when executed by the at least one processor, further cause the mobile robot to select the position to be updated as a candidate position when the repetition condition is satisfied, and update the status parameter along the direction in which the cost is increased in the selected candidate position to repeatedly perform a position estimating process.

8. The mobile robot of claim 6, wherein the repetition condition includes whether a variation between the cost calculated in the position to be updated and a cost calculated in the previous position is within a predetermined threshold value.

9. The mobile robot of claim 1, wherein the instructions, when executed by the at least one processor, further cause the mobile robot to predict a movement point using odometry information calculated based on the edge and estimate the current position using the predicted movement point and a key frame which is adjacent to the movement point.

10. The mobile robot of claim 1, wherein the instructions, when executed by the at least one processor, further cause the mobile robot to predict movement point using one of first odometry information calculated based on the edge and second odometry information calculated based on inertia information and estimate the current position using the predicted movement point and a key frame which is adjacent to the movement point.

11. The mobile robot of claim 10, wherein the instructions, when executed by the at least one processor, further cause the mobile robot to select the first odometry information when the first odometry information satisfies the predetermined condition and select the second odometry information when the first odometry information does not satisfy the predetermined condition.

12. The mobile robot of claim 10, wherein the instructions, when executed by the at least one processor, further cause the mobile robot to search for at least one key frame among a previously stored key frame set based on the predicted movement point and estimate the current position of the mobile robot using at least one searched key frame.

13. The mobile robot of claim 1, wherein the edge is extracted by obtaining gradients in a first axis direction and a second axis direction from each pixel of the at least one pair of stereo images or by performing smoothing processing on the received stereo image and obtaining a smoothing image and comparing the obtained smoothing image and the stereo image.

14. A method of recognizing a position of a mobile robot, the mobile robot including a camera, at least one processor, and a non-transitory computer-readable medium storing instructions that, when executed by the at least one processor, cause the mobile robot to perform the method, the method comprising:
receiving at least one pair of stereo images obtained using the camera;
extracting an edge from the at least one pair of stereo images;
projecting a seed in a key frame selected based on the extracted edge onto the at least one pair of stereo images;
updating a status parameter indicating a rotation and a movement of the mobile robot along a direction in which a calculated cost increases in accordance with the projected seed; and
estimating a position of the mobile robot using the updated status parameter,
wherein the key frame includes a set of seeds generated by stereo matching edges extracted from the stereo images,
wherein the set of seeds includes at least one of an image coordinate, a disparity, a pixel value, and a gradient,
wherein the method further comprises restoring three-dimensional coordinates of the set of seeds using an optical axis, a focal length, a distance between stereo lenses of the camera system and a disparity value, and
wherein the three-dimensional coordinates have depth values.

15. The method of claim 14, wherein the estimating includes, projecting each seed in the selected key frame onto the at least one pair of stereo images to calculate the cost for a current position of the mobile robot, calculating the direction in which the cost increases in the current position of the mobile robot, updating the status parameter in a position to be updated along the direction in which the cost increases, and estimating the current position of the mobile robot as a position having the highest cost based on the updated status parameter,
and wherein the method further comprises, when the mobile robot moves a predetermined distance, (i) calculating the depth values by projecting the three-dimensional coordinates corresponding to the key frame into the current image, (ii) setting uncertainty of the depth values, (iii) increasing a success variable or a failure variable according to a result of comparing the uncertainty of the depth values with a predetermined threshold, (iv) filtering the depth values to satisfy reliability defined by the success variable and the failure variable, and (v) updating the filtered depth values to obtain three-dimensional information on the edges.

16. The method of claim 15, wherein the estimating includes calculating the direction in which the cost is increased from $T_c^i$ in the current position by $$\frac{\partial f(prj(T_c^i, P_i))}{\partial T_c^i},$$

in which $P_i$ indicates a coordinate restored by the seed, prj ( ) indicates a function of returning the projection coordinate of the seed to the camera, and f( ) indicates a function of returning the edge size in the image.

17. The method of claim 16, wherein the estimating includes calculating the status parameter $T_c^{i+1}$ in the position to be updated by the following equation $$T_c^{i+1} \leftarrow \exp\left(k \frac{\partial f(prj(T_c^i, P_i))}{\partial T_c^i}\right) T_c^i$$

in which k indicates an arbitrary constant which adjusts a convergence speed.

18. The method of claim 14, wherein the estimating includes calculating the cost using the status parameter in the position to be updated, checking whether a predetermined repetition condition is satisfied to re-estimate the position in the position to be updated, and estimating the position to be updated as a final position when the repetition condition is not satisfied.

19. The method of claim 18, wherein the estimating including repeatedly performing:
   selecting the position to be updated as a candidate position when the repetition condition is satisfied; and
   updating the status parameter along the direction in which the cost increases in the selected candidate position.

20. The method of claim 18, wherein the repetition condition includes whether a variation between the cost calculated in the position to be updated and a cost calculated in the previous position is within a predetermined threshold value.

\* \* \* \* \*